US012311510B2

(12) United States Patent
Gottlieb

(10) Patent No.: US 12,311,510 B2
(45) Date of Patent: May 27, 2025

(54) AUTOFEED SCREWDRIVER ATTACHMENT WITH CLAMP-ON CONNECTOR

(71) Applicant: Kyocera Senco Industrial Tools, Inc., Cincinnati, OH (US)

(72) Inventor: Gregory M. Gottlieb, Loveland, OH (US)

(73) Assignee: Kyocera Senco Industrial Tools, Inc.

( * ) Notice: Subject to any disclaimer, the term of this patent is extended or adjusted under 35 U.S.C. 154(b) by 350 days.

(21) Appl. No.: 17/851,404

(22) Filed: Jun. 28, 2022

(65) Prior Publication Data

US 2023/0022832 A1 Jan. 26, 2023

Related U.S. Application Data

(60) Provisional application No. 63/223,712, filed on Jul. 20, 2021.

(51) Int. Cl.
*B25B 23/06* (2006.01)
*B25B 23/00* (2006.01)

(52) U.S. Cl.
CPC ........ *B25B 23/065* (2013.01); *B25B 23/0007* (2013.01)

(58) Field of Classification Search
CPC ..... B25B 23/04; B25B 23/045; B25B 23/065; B25B 23/0007; B25B 21/00; B25F 5/00;
(Continued)

(56) References Cited

U.S. PATENT DOCUMENTS 989,758 A 4/1911 Bowers
5,199,506 A * 4/1993 Dewey .................... B25C 1/184 173/104

(Continued)

FOREIGN PATENT DOCUMENTS

CN 208451524 2/2019
CN 208451526 2/2019

(Continued)

OTHER PUBLICATIONS

Notice of Reasons for Refusal, Japan Patent Office (Sep. 8, 2022, 8 pages).

*Primary Examiner* — Robert J Scruggs
(74) *Attorney, Agent, or Firm* — Frederick H. Gribbell; Russell F. Gribbell; William E. Crouse

(57) ABSTRACT

A clamping connector for an autofeed attachment for a screwdriver tool. The connector has a cam action lever that actuates a clamp. The lever moves between an open position and a closed position. In the closed position, the clamp slightly deforms to hold the autofeed attachment onto an extension pole and/or the front end of a screwdriver tool (or electric drill). The connector, while either in its 'clamped' or 'open' state, includes an open central region that allows a rotatable shaft or drive bit to pass therethrough, unimpeded. The connector includes a washer with a flat portion that prevents improper axial rotation of the lever as the lever is actuated, or at any stable position. The flat extension helps guide the lever into pivoting along a longitudinal axis of the attachment. An adjustable bolt adjusts the clamping force, and secures the lever, washer, and clamp together on the autofeed attachment.

19 Claims, 13 Drawing Sheets

(58) Field of Classification Search
CPC .......... B25F 5/001; B25F 5/003; B25F 5/005; B25F 5/006; B25F 5/008; B25F 5/02
See application file for complete search history.

(56) References Cited

U.S. PATENT DOCUMENTS

| | | | | |
|---|---|---|---|---|
| 6,601,478 | B1 * | 8/2003 | Hanson | B25H 1/0035 81/177.2 |
| 6,862,963 | B2 | 3/2005 | Habermehl | |
| 6,945,140 | B2 * | 9/2005 | Gibbons | B25B 23/04 81/57.37 |
| 10,414,030 | B2 | 9/2019 | Vandenberg | |
| 10,632,599 | B2 | 4/2020 | Yao | |
| 2013/0112051 | A1 | 5/2013 | Desmond | |
| 2015/0328754 | A1 | 11/2015 | Hung | |
| 2020/0030949 | A1 | 1/2020 | Foser | |
| 2020/0055177 | A1 * | 2/2020 | Scott | B25F 5/02 |
| 2020/0298382 | A1 * | 9/2020 | Clark | B25B 23/045 |

FOREIGN PATENT DOCUMENTS

| | | |
|---|---|---|
| CN | 208451527 | 2/2019 |
| CN | 208468283 | 2/2019 |
| CN | 210968744 | 7/2020 |
| CN | 212146275 | 12/2020 |
| EP | 2027517 | 2/2009 |
| JP | 59009397 | 1/1984 |
| JP | 03110296 | 11/1991 |
| JP | 3110890 | 5/2005 |
| JP | 57083191 | 9/2015 |
| WO | 2012066215 | 5/2012 |

* cited by examiner

AUTOFEED SCREWDRIVER ATTACHMENT WITH CLAMP-ON CONNECTOR

CROSS-REFERENCE TO RELATED APPLICATIONS

The present application claims priority to provisional patent application Ser. No. 63/223,712, titled "AUTOFEED SCREWDRIVER ATTACHMENT WITH CLAMP-ON CONNECTOR," filed on Jul. 20, 2021.

TECHNICAL FIELD

The technology disclosed herein relates generally to automatic screwdriving equipment and is particularly directed to an autofeed attachment of a type than can be mounted to a manual-feed screwdriver, thereby converting the overall tool "system" into an automatic feed screwdriver. Embodiments are specifically disclosed as a clamping subassembly having a movable lever that actuates a clamp, with a rotatable drive bit positioned at the center of the clamp. To connect to a tool body, the movable lever is rotated by a human user, and the clamp somewhat deforms and closes onto the front end of a manual-feed screwdriver, or onto the front end of an electric drill, or onto the front end of an extension 'pole' for a manual-feed screwdriver. The rotatable drive bit is not affected by the clamp's deformation, and is mated with the manual-feed screwdriver, or with the extension pole, or with a chuck adapter that mates with the chuck of an electric drill, thereby allowing the autofeed's drive bit to be rotated for automatically screwing fasteners into a workpiece.

The clamp-on connector is positioned in the autofeed attachment housing at or proximal to an open end, at the opposite end from where the screws are driven. An extension pole or a front end of a manual-feed screwdriver can be mated to this open end, or a chuck adapter that is mounted to an electric drill can have its opposite end mated to this open end of the attachment. The clamp-on connector is used to securely hold the extension, manual-feed screwdriver, or chuck adapter to the autofeed attachment.

The autofeed attachment has a longitudinal axis, and the connector includes the clamp and the movable lever, but also a washer exhibiting a flat portion. The movable lever exhibits a cam offset diameter, and when rotated in a first direction along the longitudinal axis against the washer's flat portion, the flat portion prevents the movable lever from unlocking too easily (i.e., rotating in a second, opposite direction along the longitudinal axis).

The autofeed attachment includes a flat extension that partially covers the movable lever. This flat extension, in combination with a flattened area of a washer at the lever, prevents the movable lever from rotating axially, and instead guides the movable lever into pivoting along the longitudinal axis.

The clamp-on connector includes an adjusting screw (or bolt) that can be used to create more clamping force, or less clamping force—as desired by the user—when the movable lever is moved to its engaged position that holds the attachment to the tool body or extension pole. The clamp itself includes a deformable portion that tightens, when engaged, against a mating surface of the extension pole or against a mating surface of an adapter that is used to mount the autofeed attachment to an electric drill or to a manual-feed screwdriver.

The autofeed attachment includes a rotatable shaft that runs through the attachment, which is typically referred to as a drive bit. When the drive bit rotates, it couples its front 'bit portion' into the head of a screw, and then causes the screw to rotate as it is being forced into a substrate material, such as a wood workpiece. The rotatable drive bit also couples with some other 'drive shaft' type of rotatable rod or shaft, which is caused to rotate by a prime mover such as an electric motor. This mechanical arrangement allows the rotatable shafts to freely rotate throughout the entire attachment, including the clamp-on connector portion, regardless as to the magnitude of force applied by the deformable clamp to the mating surface of the extension pole or an external adapter. In other words, the amount of tightening force applied at the mechanical interface of the mating surfaces does not affect the ability of the rotatable shafts to perform their rotating functions.

STATEMENT REGARDING FEDERALLY SPONSORED RESEARCH OR DEVELOPMENT

None.

BACKGROUND

Several manufacturers of power tools sell manually-fed ("single-feed") screwdriving tools, and some of those manufacturers also sell "autofeed" screwdriving tools. The autofeed screwdriving tools typically use some type of collated strips that hold multiple screws at fairly precise intervals, and these collated strips of screws are fed into an indexing mechanism at the front portion of the autofeed screwdriving tool. The user has to merely place the front tip of the tool against a workpiece, and then pull the trigger on the tool while pressing the tool against the workpiece. When that occurs, the tool will automatically index a screw to the "driving position," and a drive bit will begin turning and will be pushed into the head of the screw, and then drive the screw all the way into the workpiece. This type of tool is well-known, and often used by professional carpenters and other construction workers.

The manually-fed screwdriving tools are used in many other situations, including people who are not necessarily professional construction workers, but nevertheless want to have a power tool for driving screws. Even professional carpenters and other construction workers will sometimes use a non-autofeed screwdriving tool, for certain purposes. This is especially popular in situations where a person already has a manually-fed screwdriving tool, but also purchases an autofeed attachment that can be affixed to the front end of the manually-fed screwdriving tool, thereby converting it into an automatic screwdriving gun. Such attachments also are well-known and popular in many construction situations.

Along with an autofeed attachment, an extension is also commonly used in many construction situations. The extension is basically an elongated pole having a rotatable shaft inside that lengthens the reach of the autofeed attachment and a manually-fed screwdriving tool. A user attaches one end of the extension pole to the autofeed attachment, and a second end of the extension pole to the front end of a manually-fed screwdriving tool. In this manner, a user can drive screws without bending over, such as in decking applications, for example.

SUMMARY

Accordingly, it is an advantage to provide an autofeed attachment that converts a manual-feed screwdriver into an automatic-feed screwdriver, in which that attachment has mechanical parts that somewhat deform and close tightly onto the front end of a manual-feed screwdriver.

It is another advantage to provide an autofeed attachment that converts a manual-feed screwdriver into an automatic-feed screwdriver, in which that attachment has mechanical parts that somewhat deform and close tightly onto an extension pole for a manual-feed screwdriver.

It is yet another advantage to provide an autofeed screwdriver attachment connector that uses a movable lever mechanically attached to a clamp having an opening that allows a rotatable drive bit or shaft to pass therethrough, in which pivoting the movable lever forces the clamp to somewhat deform and close tightly over a mating part, but does not affect the rotatable drive bit or shaft.

It is still another advantage to provide an autofeed screwdriver attachment connector that uses a pivotable lever having cam offset diameters and a washer with a flat portion, both mechanically attached to a clamp, in which pivoting the lever forces the clamp to somewhat deform and close tightly over a mating part, and the washer's flat portion prevents the pivotable lever from being easily rotated due to the cam offset diameters.

It is a further advantage to provide an autofeed screwdriver attachment having a clamp-on connector that is actuated by a movable lever, in which the clamp-on connector has an opening that allows a rotatable drive bit or shaft to pass therethrough, and in which a mating part—such as an extension pole, or a single-feed screwdriver, or an electric drill—that includes a rotating shaft or chuck is received and tightly held in place by the clamp-on connector.

It is a yet further advantage to provide an autofeed screwdriver attachment having a clamp-on connector that is actuated by a movable lever, in which the clamp-on connector has an open central region that allows a rotatable shaft or drive bit to pass therethrough unimpeded, whether the lever and clamping subassembly are in their 'clamping' (or 'closed') state or in their 'open' ('unclamping') state.

It is a still further advantage to provide an autofeed screwdriver attachment having a clamp-on connector that is actuated by a movable lever, in which the lever subassembly includes a washer with a flat portion that is closely proximal to a transverse extension that prevents the washer and lever subassembly from improperly rotating to a position that would cause the lever to move out of plane with the longitudinal axis of the autofeed attachment, as the lever is being moved by a user, or when it is positioned at any of its stable (i.e., 'open' or 'closed') positions.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an autofeed screwdriver attachment is provided, which comprises: (a) a housing exhibiting an open first end used for attaching to a removable external tool, and an opposite, second end used for driving a fastener, the housing having a longitudinal axis that extends at least between the first end and the second end; (b) a rotatable drive bit mounted along the longitudinal axis inside the housing; (c) a connector portion proximal to the open first end, the connector portion comprising: (i) a movable lever; (ii) a washer proximal to the lever; (iii) a clamp exhibiting a gap portion, a deformable portion, and an inner surface that is sized and shaped to make physical contact with a protruding portion of the external tool; (iv) a bolt that securely mounts the movable lever, the washer, and the clamp to the housing; wherein: (d) if the movable lever is moved to a first position, the washer and the bolt do not cause the clamp to deform the deformable portion, and the gap portion is in an open state, such that the clamp inner surface does not securely hold the protruding portion of the removable external tool; and (e) if the movable lever is moved to a second position, the washer and the bolt exert a greater force on the clamp sufficient to deform the deformable portion, the gap portion becomes narrowed, and the clamp inner surface tightens around the protruding portion of the external tool so as to securely hold the external tool in place.

In accordance with another aspect, a method for attaching a power tool attachment to a power tool adapter is provided, in which the method comprises the following steps: (a) providing a power tool adapter that includes a first open end that includes a protrusion; (b) providing a power tool attachment that includes: (i) a housing including a second open end, the housing exhibiting a longitudinal axis that extends at least to the second open end; (ii) a connector portion that is proximal to the second open end of the power tool attachment, the connector portion being used for mating against the protrusion of the power tool adapter; and (iii) a rotatable shaft positioned along the longitudinal axis of the housing; (iv) the connector portion comprising: (A) a movable lever; (B) a washer proximal to the lever; (C) a clamp exhibiting a gap portion, a deformable portion, and an inner surface that is sized and shaped to make physical contact with the protrusion of the power tool adapter; (D) a bolt that securely mounts the movable lever, the washer, and the clamp to the housing; (c) inserting the protrusion of the power tool adapter into the inner surface of the clamp; and (d) pivoting the movable lever, wherein: (i) as the lever is pivoted, the gap portion moves to a more closed state; and (ii) the deformable portion deforms such that the clamp inner surface tightens and grips the protrusion of the power tool adapter.

In accordance with yet another aspect, a clamp-on connector for an autofeed screwdriver attachment is provided, which comprises: (a) a movable lever; (b) a washer; (c) a clamp exhibiting a gap portion and a deformable portion; (d) a bolt that securely mounts the movable lever, the washer, and the clamp to the autofeed screwdriver attachment; (e) the autofeed screwdriver attachment including: (i) a housing exhibiting an open first end used for attaching and an opposite, second end used for driving a fastener, the housing having a longitudinal axis that extends at least between the first end and the second end; (ii) a rotatable drive bit mounted along the longitudinal axis inside the housing; and (iii) the connector is positioned proximal to the open first end; wherein: (f) if the movable lever is moved to a first position, the gap portion is in an open position, and the deformable portion is not deformed and the clamp does not securely hold a removable external part; and (g) if the movable lever is moved to a second position, the gap portion is in a more closed position, and the deformable portion is deformed and the clamp securely holds a removable external part.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
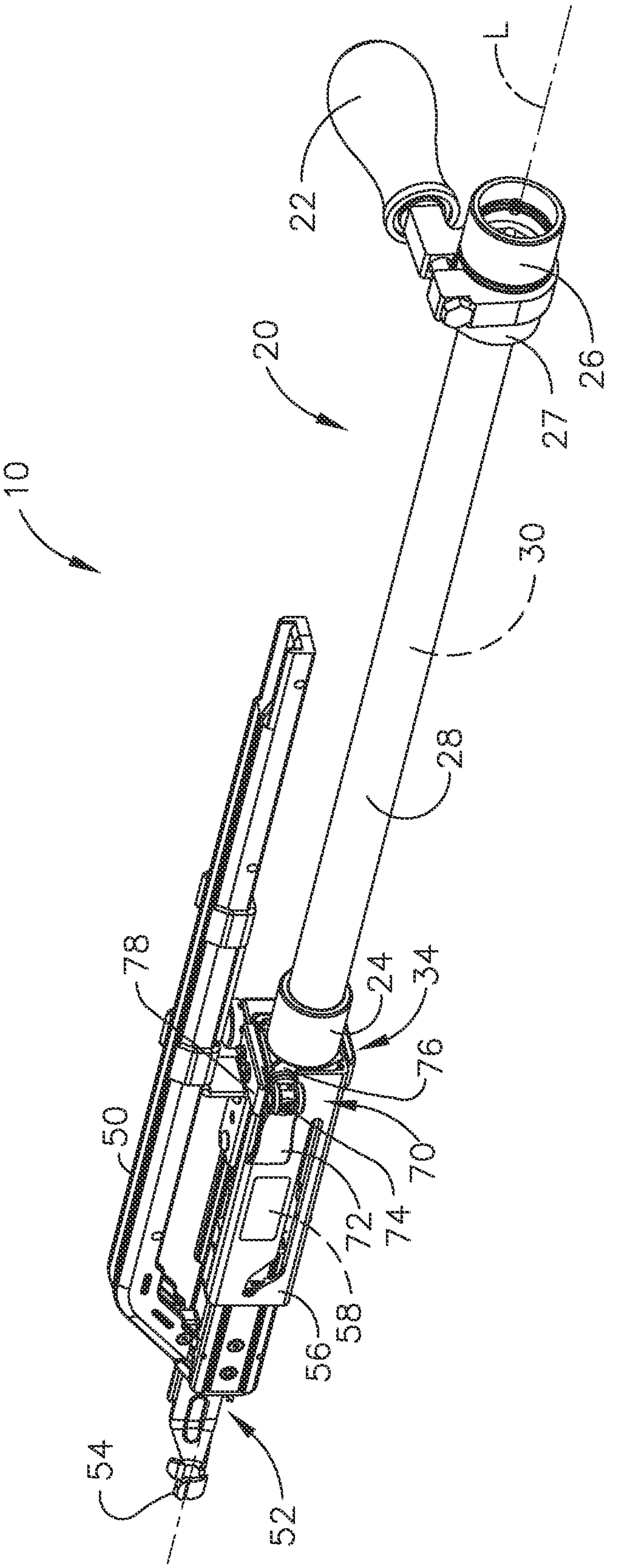
FIG. 1 is a perspective view of an autofeed screwdriver attachment mated with the front end of an extension, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

In addition, it should be understood that embodiments disclosed herein include both hardware and electronic components or modules that, for purposes of discussion, may be illustrated and described as if the majority of the components were implemented solely in hardware.

Referring now to FIG. 1, an autofeed attachment 10 (also sometimes referred to herein as a "front end" of an overall tool) is shown mated to an extension pole 20. The extension pole 20 is an elongated cylindrical tube with a hollow interior area. The autofeed attachment 10 has an outer body or housing 56, a fastener feeder (a 'guide rail') 50, a fastener exit 52 (also sometimes referred to herein as an "exit end" or a "second end"), a nosepiece or 'guide' 54, and an internal rotatable drive bit 58 (see FIG. 3). Note: the opposite end of the attachment, discussed below, can be referred to as a "first end" of the attachment, or its "open end" or its "receiving end."

Positioned at the rearward portion of the housing 56 is a connector portion (or clamping connector subassembly) 70, which is positioned at the open, first end of the attachment 10. The connector portion 70 includes a movable lever or handle 72, a bolt 74, and a washer 76. A transverse extension 78 exhibiting a flattened surface is mounted on the housing 56 proximal to the movable lever 72.

The extension pole 20 has a first extension end 24 (also sometimes referred to herein as a "first open receiving area"), an elongated pole 28, a rotatable internal extension shaft 30 (also sometimes referred to herein as a "drive shaft" or an "extension rotatable bit") inside the pole's outer housing 28, a second extension end 27 (also sometimes referred to herein as a "second open receiving area"), a handle 22, and a third "end" or "adapter" 26. The third end/adapter 26 preferably screws onto the second extension end 27 at a proximal end, and can be used separately to 'mate' with the front end of a manual-feed screwdriver at a distal end (see FIG. 2). The drive shaft 30 is located at the interior portion of the extension pole 20, and the drive shaft runs the length of the cylindrical tube.

The first extension end 24 mates with the open first end 34 of the autofeed attachment 10. The rotatable drive shaft 30 mates (i.e., mechanically couples) with the rotatable drive bit 58, and a protrusion 25 (or protruding portion) is securely held in the connector portion 70, as will be discussed in more detail below, in connection with FIG. 4. The rotatable drive shaft 30 is sized and shaped to be in mechanical communication with the rotatable drive bit 58.

Figure 2:
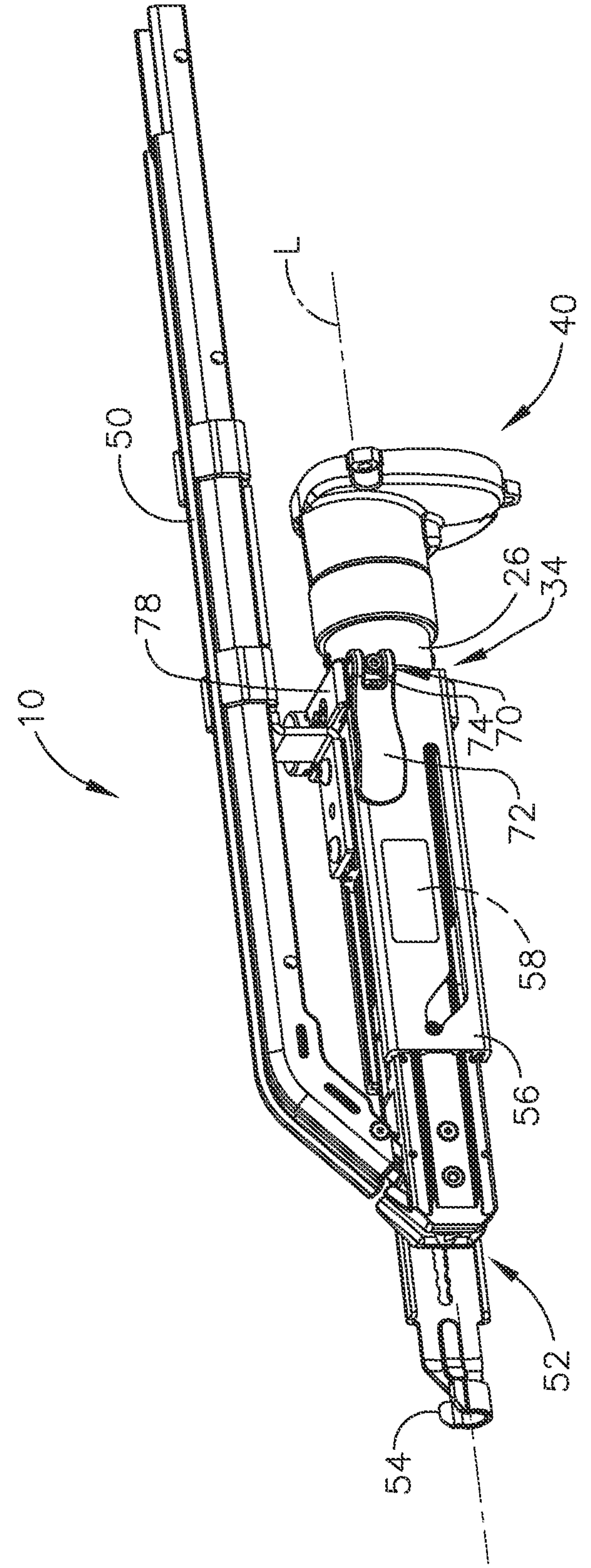
FIG. 2 is a perspective view of the attachment of FIG. 1, mated with the front end of a manual-feed screwdriver.

Referring now to FIG. 2, the autofeed attachment 10 is shown mated to the front end of a manual-feed tool 40, such as a screwdriver, for example. The adapter 26 is first attached to the tool 40, and then the adapter is mated to the autofeed attachment 10 via the connector portion 70. It should be noted that the adapter 26 is preferably screwed on (or otherwise mounted) to the front end of a screwdriver, for example.

If, for example, the power tool 40 is an electric drill, then the adapter 26 would fit into the autofeed attachment's connector portion 70 on one end, and at its opposite end the adapter 26 would mount onto the chuck of that electric drill. (The adapter 26 for an electric drill would of course be a different part than an adapter that mounts to a single-shot screwdriver.) If, for example, the power tool 40 is an electric screwdriver, then the adapter 26 would mount onto the rotatable output shaft of the electric screwdriver on one end, and at its opposite end the adapter 26 would fit into the autofeed attachment's connector portion 70.

Figure 3:
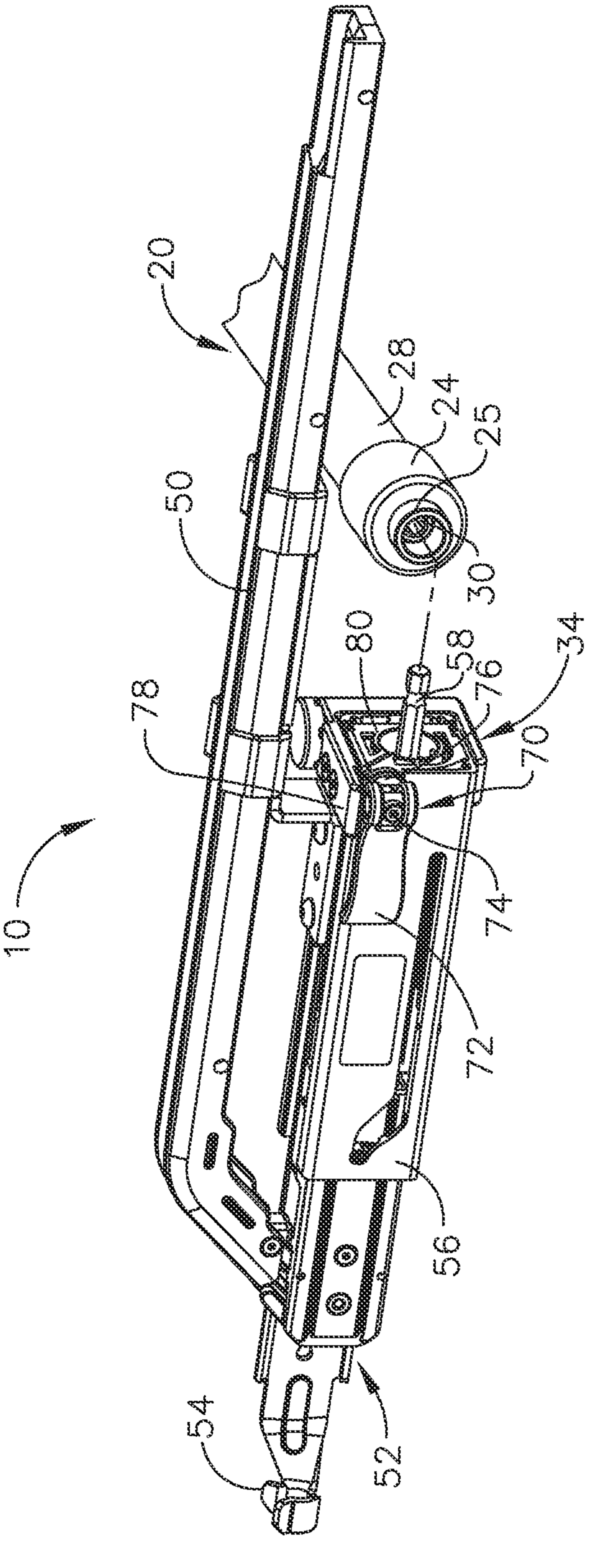
FIG. 3 is a perspective view of the attachment of FIG. 1, showing the interior of the front end of the extension.

Referring now to FIG. 3, the autofeed attachment 10 is shown separated from the extension pole 20. In this view, the extension pole 20 is rotated to illustrate the end of the extension's rotatable drive shaft 30. The first extension end 24 exhibits a cylindrical protrusion or post 25 which seats into a clamp 80 when mating the extension pole 20 to the autofeed attachment 10. At the same time, the extension's drive shaft 30 mates with the rotatable bit 58—see FIG. 4, discussed below.

Figure 4:
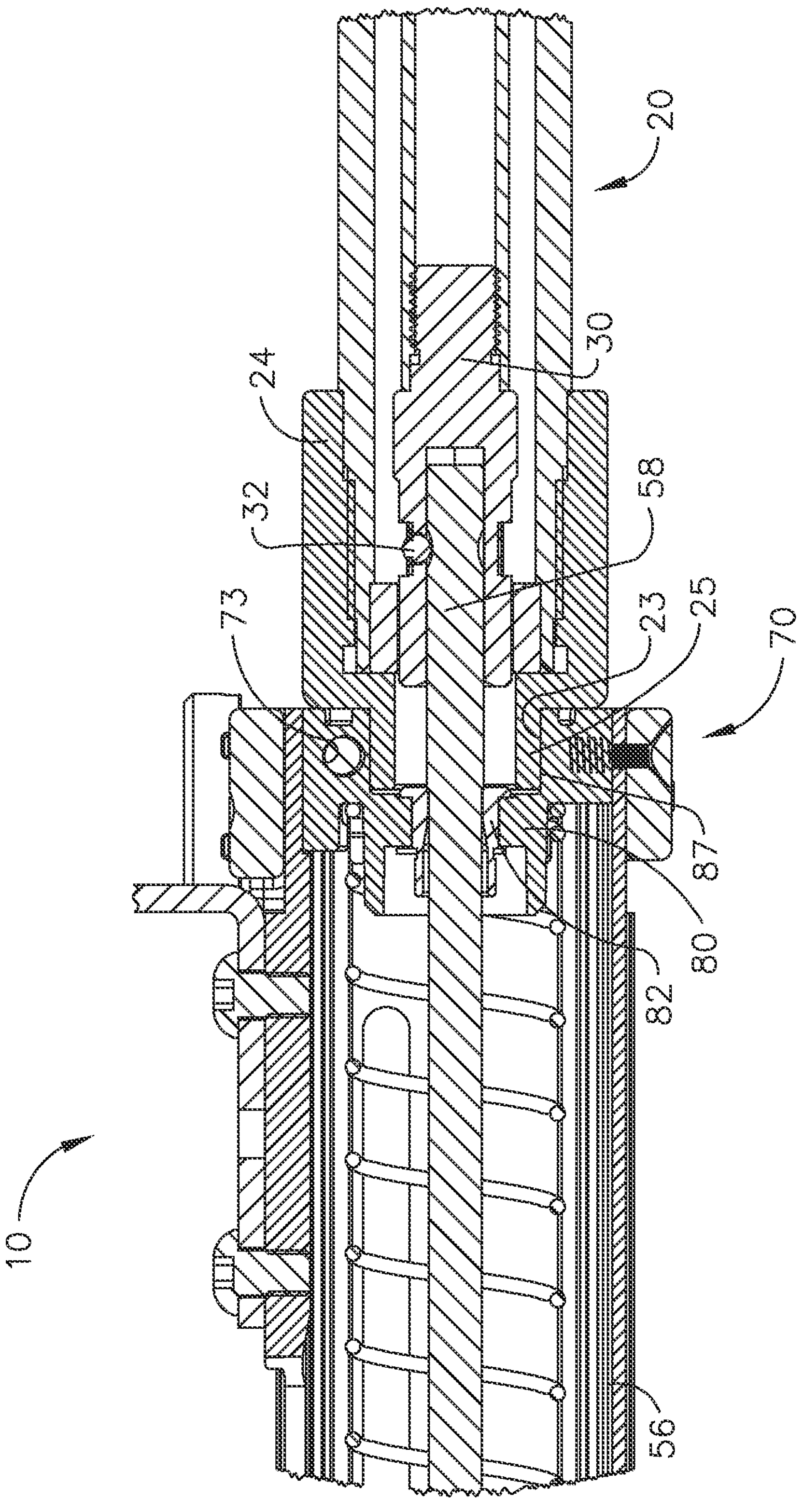
FIG. 4 is a side cutaway view of the attachment of FIG. 1, showing a rotatable bit secured in the front end of the extension.

Referring now to FIG. 4, a side cutaway view of the autofeed attachment 10 mated with the extension pole 20 is shown. The rotatable drive bit 58 is mated with the extension rotatable drive shaft 30. (Note that, drive shaft 30 continues inside the extension pole 20 to its opposite end 27, and the numbered portion 30 on FIG. 4 represents an interface portion that couples over the proximal end of the drive bit 58.) A bit retainer 32 in the first extension end 24 is used to removably hold the rotatable drive bit 58 in place with the extension rotatable drive shaft 30.

As the extension pole 20 is inserted into the open end of the connector 70 of the autofeed attachment 10, the protrusion 25 is mated into the clamp 80 at a portion 87. These two structures 25 and 87 are essentially cylindrical in shape, in which the protrusion 25 acts as the "male end" and the opening 87 acts as the "female end" of the overall mechanical connection, which make physical contact together at an interface that has the appearance of a line 23 on this cutaway view of FIG. 4. As explained below, this contact 'line' 23 becomes the clamping surface that holds the extension pole 20 and the autofeed attachment 10 together under predetermined conditions. It will be understood that the structures 24, 25, and 30 of the extension pole 20 are essentially duplicated by an adapter (not shown in FIG. 4) so as to join a separate power tool body (such as an electric drill or single-feed screwdriver) directly to the autofeed attachment 10, without the use of an extension pole 20—as per FIG. 2 and FIG. 13.

Figure 5:
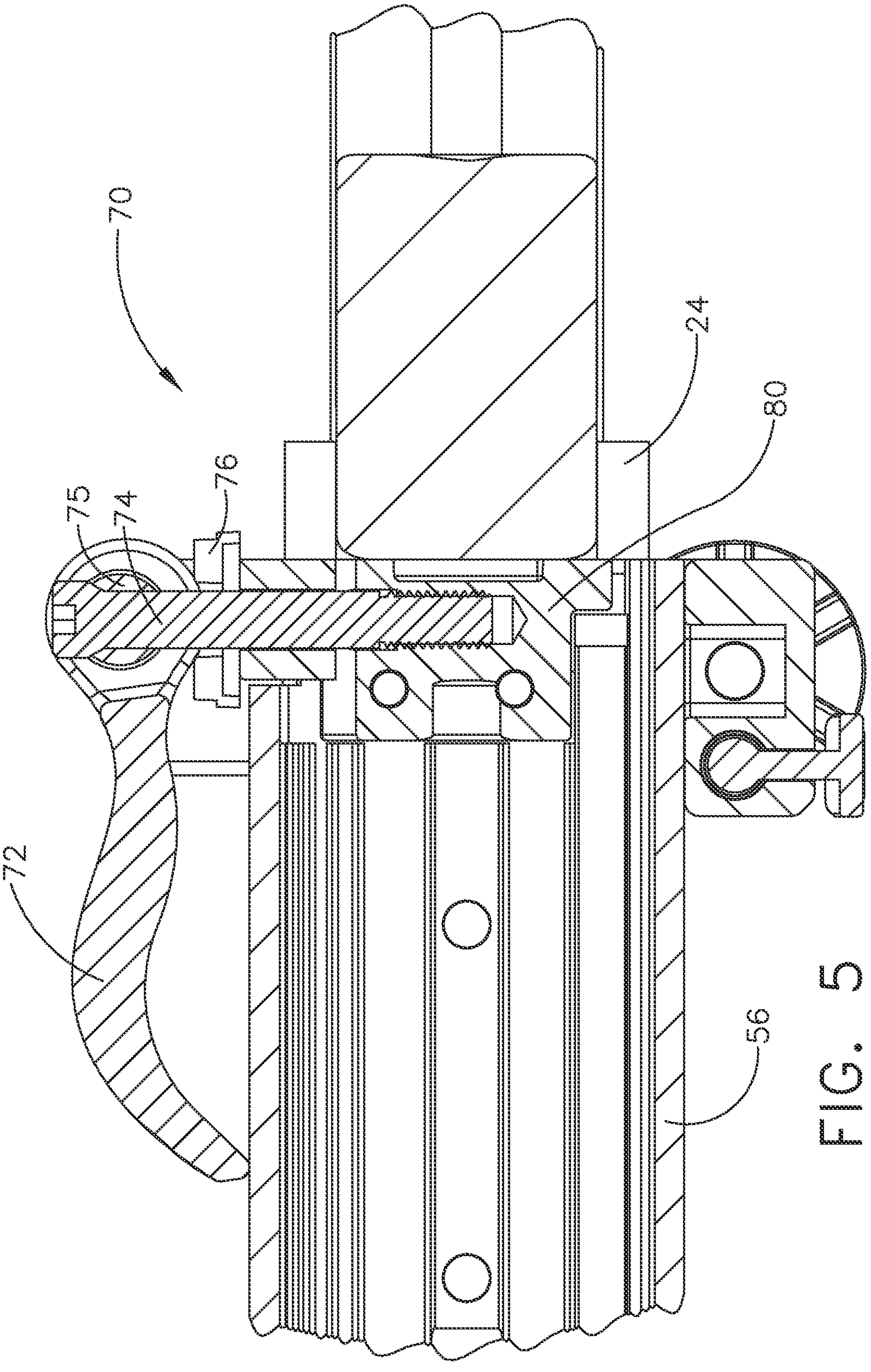
FIG. 5 is a bottom cutaway view of the attachment of FIG. 1, showing a connector in a locked position.

The connector portion 70 includes an opening 73 that the bolt 74 seats into; opening 73 runs deep into the clamp 80, and is partially threaded to receive the external threads of the bolt 74 (see FIG. 5). In the center of the clamp 80 is a bit guide 82 (also sometimes referred to herein as a "bushing" or a "bearing"). The bit guide 82 retains the rotatable bit 58 in place during operation, and the bit guide 82 does not deform when the connector portion 70 is in a locked (or closed) position.

Referring now to FIG. 5, a bottom cutaway view of the autofeed attachment 10 mated with the extension pole 20 is shown. The bolt 73 extends from the lever 72 through an opening in a pin 75, through the washer 76, and is secured in the clamp 80. As will be understood from observing FIG. 5, if the bolt 73 is tightened, the greater the clamping force that will be exerted onto the clamp 80 by the combination of the pivotable lever 72 and the washer 76, in the circumstance where the lever 72 is in its 'locked' position. (It is preferred that a nominal setting of the clamping force be set at the factory when assembling and setting up the connector 70, including the nominal positioning of the bolt 73.)

Figure 6:
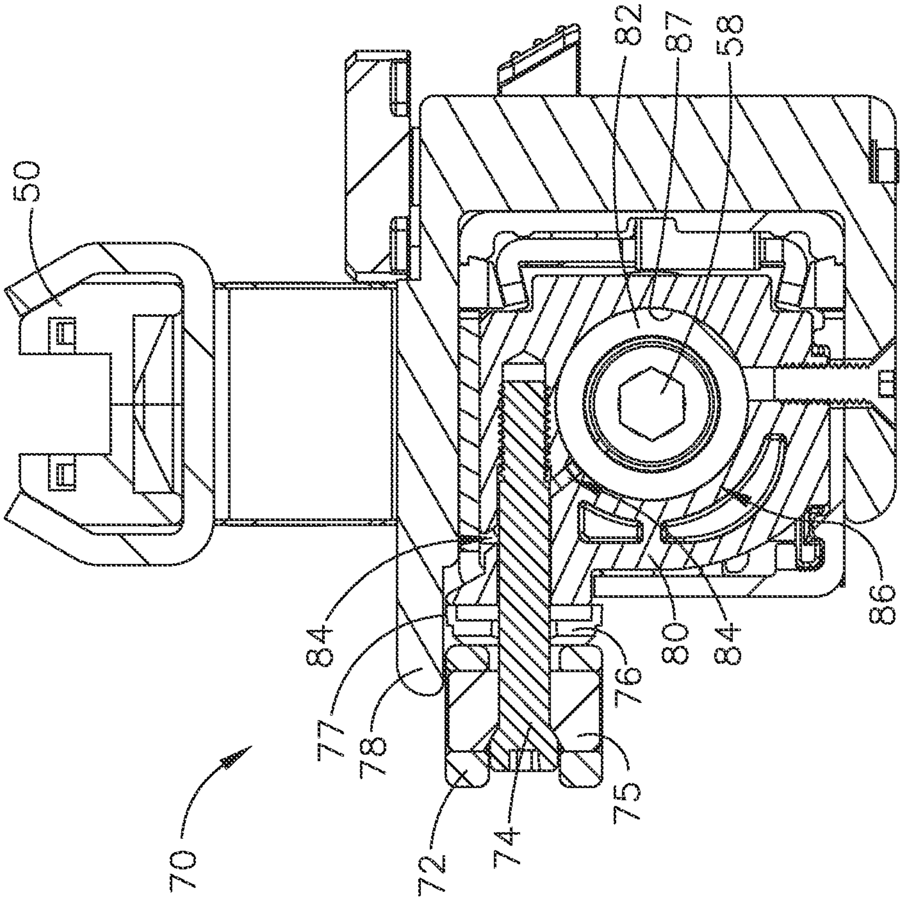
FIG. 6, is a rear cutaway view of the attachment of FIG. 1, showing a clamp and rotatable bit of the connector portion.

Referring now to FIG. 6, a rear cutaway view of the autofeed attachment 10 is shown. The clamp 80 exhibits a gap 84 and a deformable portion 86. (Note: this gap 84 is more clearly illustrated in FIG. 12.) When the lever 72 is in an open position, the lever is not pressing tightly on the washer 76 and is not simultaneously pulling on the bolt 74; therefore, the gap 84 is also in a fully open position and the deformable portion 86 is not deformed. However, when the lever 72 is in a closed position, the lever is pressing on the washer 76 and is simultaneously pulling on the bolt 74. This causes the gap 84 to somewhat close, which also causes the deformable portion 86 to slightly deform. This deformation of the deformable portion 86 then tightly holds (or "clamps") onto the protrusion 25 of the first extension end 24 of the extension pole 20.

Figure 9:
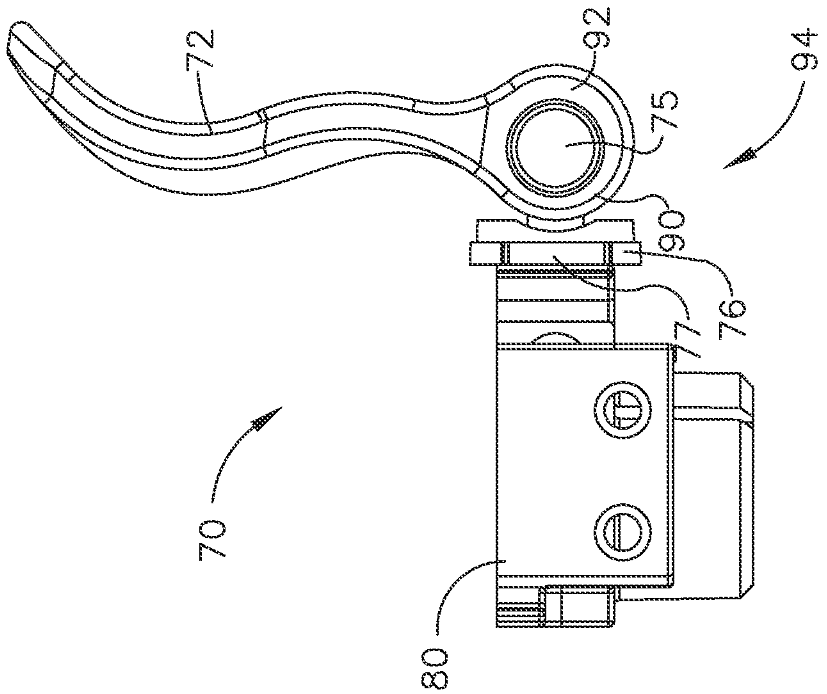
FIG. 9 is a top view of the connector portion or subassembly of FIG. 7, showing an unlocked position.
Figure 8:
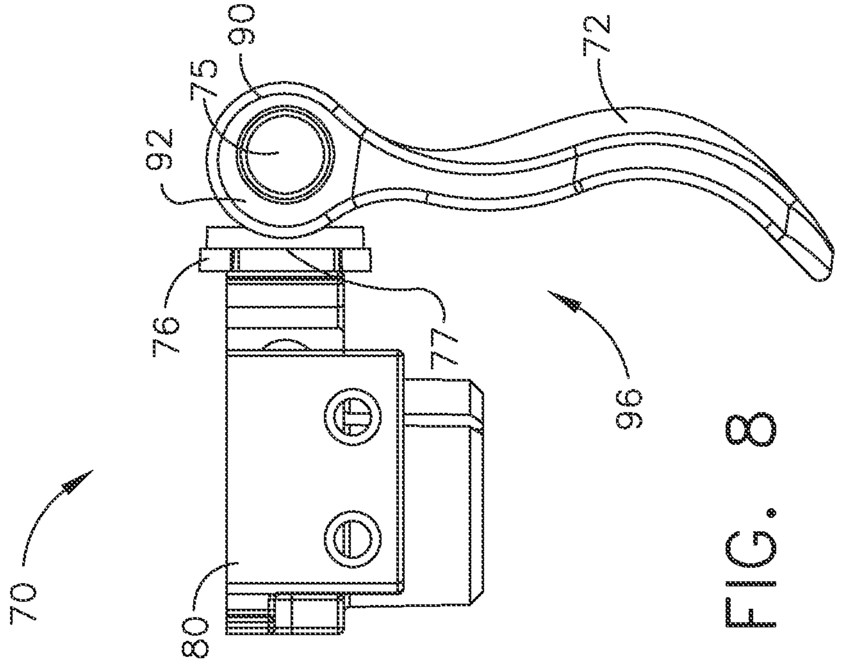
FIG. 8 is a top view of the connector portion or subassembly of FIG. 7, showing a locked position.

Note that the bearing 82 does not deform in a lever open position 94 or a lever closed position 96 (see FIGS. 8 and 9). The bearing 82 must be constructed of a material, such as steel, for example, sufficiently hard and strong so as to not deform when the deformable portion 86 deforms. The rotatable bit 58 is therefore always free to rotate when engaged with either the screwdriver 40 or the extension pole 20, no matter the position of the lever 72.

As can be seen in FIG. 6, the flat extension 78 partially covers the lever 72. The flat extension 78 thereby prevents the lever 72 from rotating axially with respect to the long axis of the bolt 74. The flat extension 78 also guides the lever 72 into moving along the longitudinal axis "L" of the entire tool when pivoting between the open position 94 and the closed position 96. It should be noted that by preventing axial rotation, the flat extension 78 also ensures the bolt 74 is not affected by the movements of the pivotable lever 72, and vice versa—see below for more detail.

In a typical conventional clamping connector of this type of design, the bolt is positioned so as to allow the lever to rotate as needed, but to still sufficiently utilize the clamping action as the lever is moved from its open (or 'loose') position to its closed (or 'clamped') position. However, in conventional designs the lever also is typically able to rotate (or pivot) perpendicular to the tool's longitudinal axis "L", because in conventional designs, there typically is no constraint on that direction of movement for the handle. For example, when viewing FIG. 2, the handle 72 potentially could 'slip' rotationally so that it no longer is pointing to the left in this view, but perhaps it could 'slip' in the clockwise direction by some angle, and it would no longer be pointing to the left—in that event, it perhaps could end up pointing "up" or "down", and be out-of-line with the longitudinal axis L.

The illustrated embodiment prevents that type of 'slippage' of the handle 72. The extension 78 covers a flattened surface 77 on the washer 76 (see FIG. 7), and therefore, the washer 76 is not able to rotate more than a tiny angular displacement. Since the washer 76 exhibits a rounded area—also sometimes referred to herein as the "seat" 79 (see FIG. 11), and since the washer cannot rotate because of its flattened surface 77, and since its seat 79 is pressed against the rounded thick portion 92 of the handle, this action prevents the handle 72 itself from being rotated in that plane, thereby overcoming that potential rotation problem described in the previous paragraph about conventional designs. The close proximity of the extension 78 and the flattened surface 77 prevents the lever 72 from being significantly rotated in an axial direction (i.e., having a perpendicular pivot axis) with respect to the longitudinal axis L.

Figure 7:
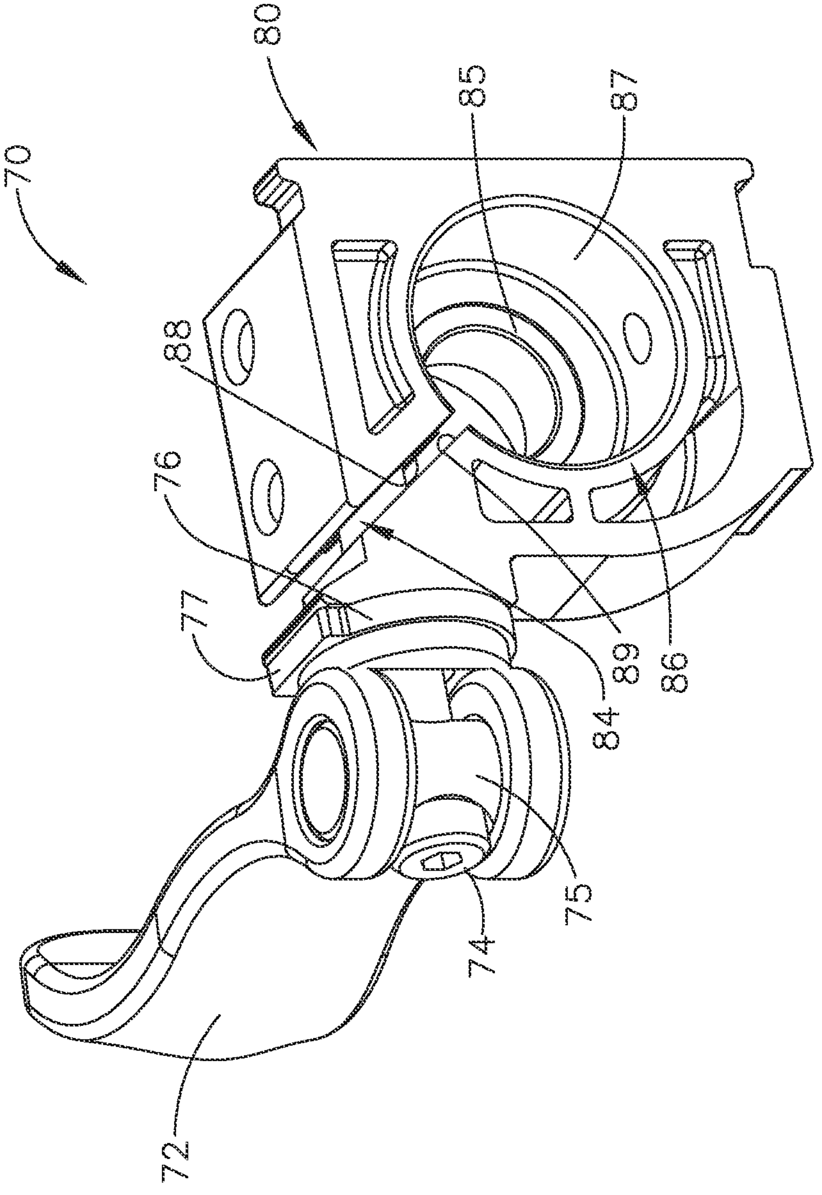
FIG. 7 is a perspective view of the connector portion or subassembly of the attachment of FIG. 1.

Referring now to FIG. 7, most of the connector portion 70 is shown in a perspective view. (The extension 78 is not shown, for clarity of other parts.) The flat portion 77 of washer 76 is clearly seen in this view, as is the "gap" 84 in the clamp 80. The clamping surface 87 is visible, as are portions of the deformable area 86. The guiding surface 85 is visible, which holds the bearing 82 in place when the drive bit 58 is installed.

Referring now to FIG. 8, the closed (or "clamping") position 96 (also sometimes referred to herein as a "second position") is illustrated. The lever 72 exhibits cam offset diameters: a thin portion 90 and a thick portion 92. The thin portion 90 and the thick portion 92 are part of a cam profile of a shaft that is proximal to the washer 76. In the closed position, the thick portion 92 is pressed against the washer 76. The thick portion 92 pulls on the bolt 74, partially closing the gap 84, which also forces the clamp 80 to deform through the deformable portion 86. As that deformation occurs, the inner surface 87 tightens around the post 25 (or the post 21) to securely hold the post in place.

Referring now to FIG. 9, the open position 94 (also sometimes referred to herein as a "first position") is illustrated. The lever 72 is not pressed against the washer 76, because the thin portion 90 is proximal to the washer in the open position. In the open position 94, the bolt 74 is not being pulled, therefore the gap 84 is not partially closed (i.e., the gap is in an "open state") and thus the clamp 80 is not deformed through its deformable portion 86. In the first position 94, the inner surface 87 does not securely hold the post 25 (or the post 21).

The handle 72 is designed to be pivoted about a pivot axis that is provided by a pivot pin 75—see FIGS. 8 and 9. In those two views, the handle pivots (or rotates) between a 9:00 o'clock position (FIG. 9) and a 3:00 o'clock position (FIG. 8). The outer portion of the lever 72 has a path of movement that is substantially parallel to the longitudinal axis L, as the lever is moved between the first position 94 and the second position 96. One cannot see from those two views alone, but the outer portion of the handle 72 essentially moves in a plane that is parallel to the tool's longitudinal axis "L", as can be more readily discerned by viewing FIG. 2, which shows the handle at its 9:00 o'clock position, as viewed from this left side of the overall attachment 10.

In FIG. 2, if the user actuates the handle 72, the only allowable movement is to (more or less) 'lift' the handle toward the user (who would be positioned on the left side of the attachment 10), and by doing so, the pivot pin 75 of the handle (proximal to the bolt 74 in this view) would prevent the entire handle from being literally lifted from the side of the attachment body 56. Instead, the left-most portion of the handle would come free, and would extend outward and to the right, and then the handle could be moved all the way to the 3:00 o'clock position, still along the same plane along longitudinal axis L. Another way of stating this configuration is to say that the pivot axis runs perpendicular to the longitudinal axis L, in which this pivot axis of the handle runs along the centerline of the bolt 74, which runs through the opening in the pivot pin 75, through the opening of the washer 76, and into the opening 73 in the connector 80.

Note that this handle pivoting action, moving from 9:00 o'clock to 3:00 o'clock, is not in a clockwise or counterclockwise rotation, as seen in this view of FIG. 2, but rather the handle's outer 'loose' end creates a semi-circular path as viewed from above the attachment in FIG. 2, for example. And that path is in a somewhat linear direction (in a plane) as viewed from the side of the attachment (as viewed in FIG. 2), and that linear direction is substantially parallel to the longitudinal axis L. (The counterclockwise or clockwise rotation, mentioned above, can be referred to as being in an "axial direction" with respect to the longitudinal axis, and such movement of the handle portion of the clamp subassembly is substantially avoided, as discussed above.)

Figure 10:
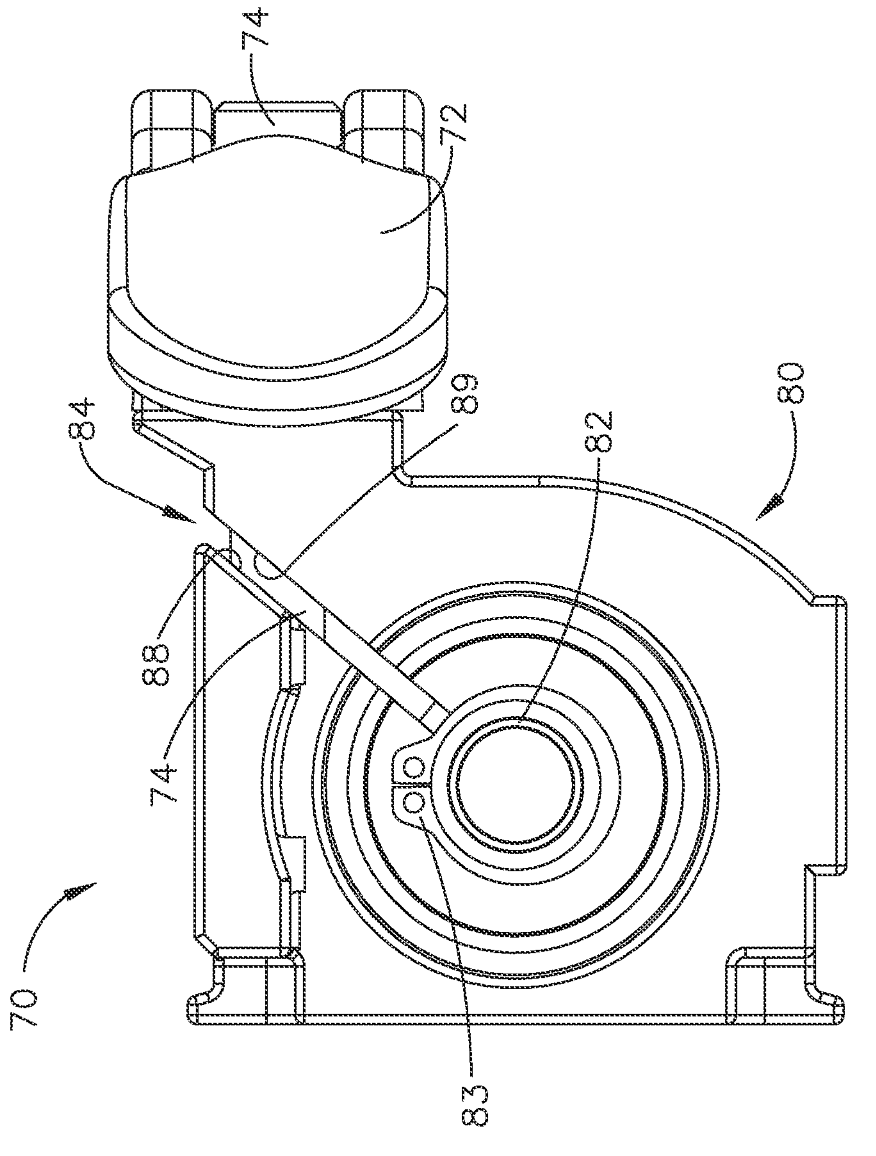
FIG. 10 is a front view of the connector portion or subassembly of FIG. 7.

Referring now to FIG. 10, a front view of the connector portion 70 is illustrated (as a stand-alone subassembly, not yet installed in the attachment). The gap 84 is visible because it extends completely through the clamp 80 in this illustrated embodiment. The installed position of a snap ring 83 can be viewed, as well. The handle 72 is seen at its 9:00 o'clock position.

Figure 11:
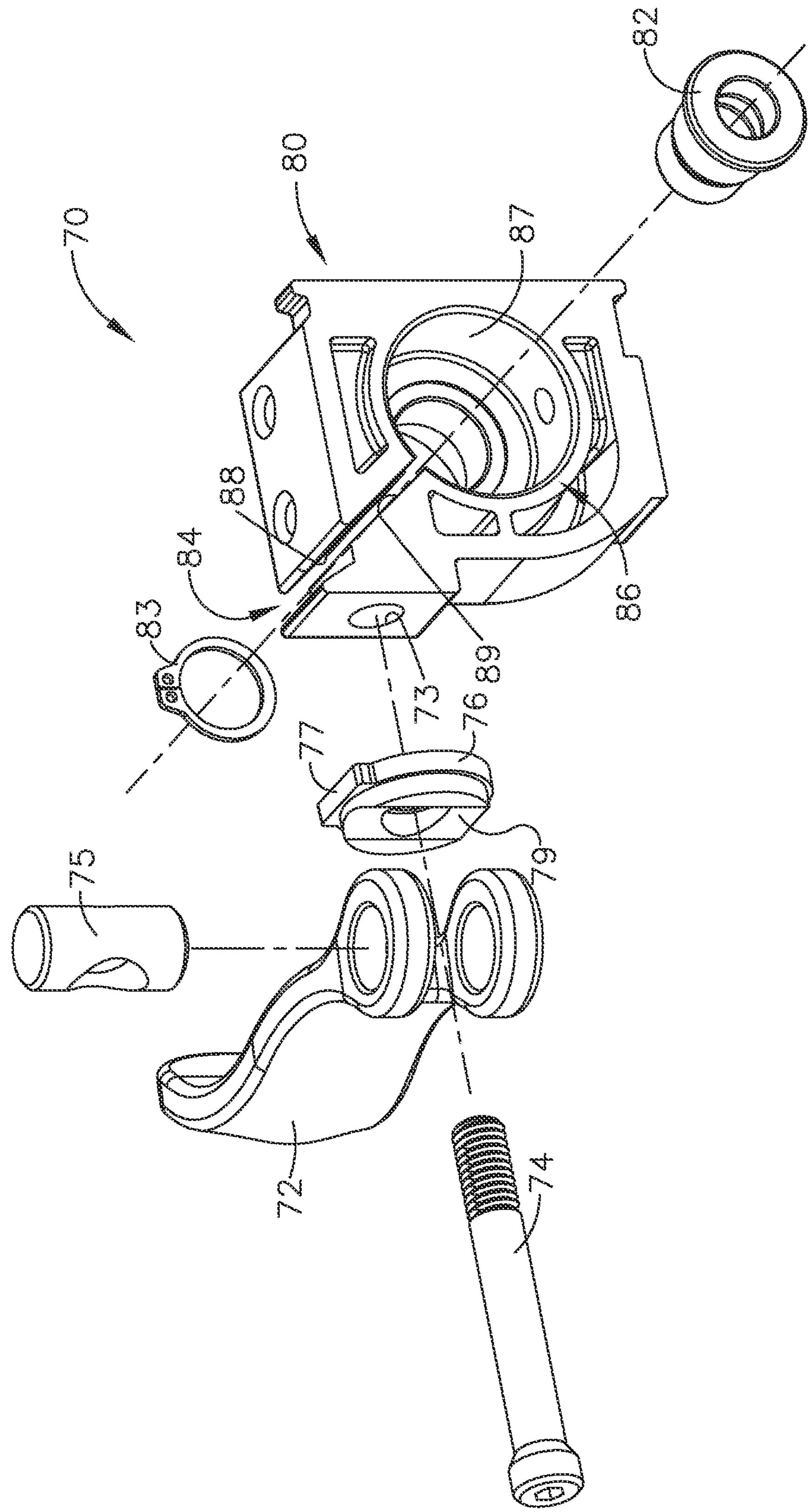
FIG. 11 is an exploded view of the connector subassembly of FIG. 7.

Referring now to FIG. 11, an exploded view of the connector subassembly 70 is shown. The washer 76 exhibits a seat portion 79, in which the lever 72 sits and rotates within. The seat portion 79 helps keep the lever 72 "in place" when in the closed position 96. The bearing 82 is held in place in the clamp 80 by the bearing snap ring 83.

In FIG. 7, the assembled handle 72, bolt 74, pivot pin 75, and washer 76 are illustrated. The bolt 74 securely mounts the handle 72, the pin 75, the washer 76, and the clamp 80 to the housing 56. It can be seen from this view and from the view of FIG. 11 that the pivot pin 75 holds together the handle 72 and the washer 76, in conjunction with the bolt 74, which passes through openings in the pivot pin, the washer, and into the opening 73 in the 'block'-shaped clamp 80. Once the bolt 74 is installed, the entire user-actuated portion of the clamping subassembly is essentially in place.

Figure 12:
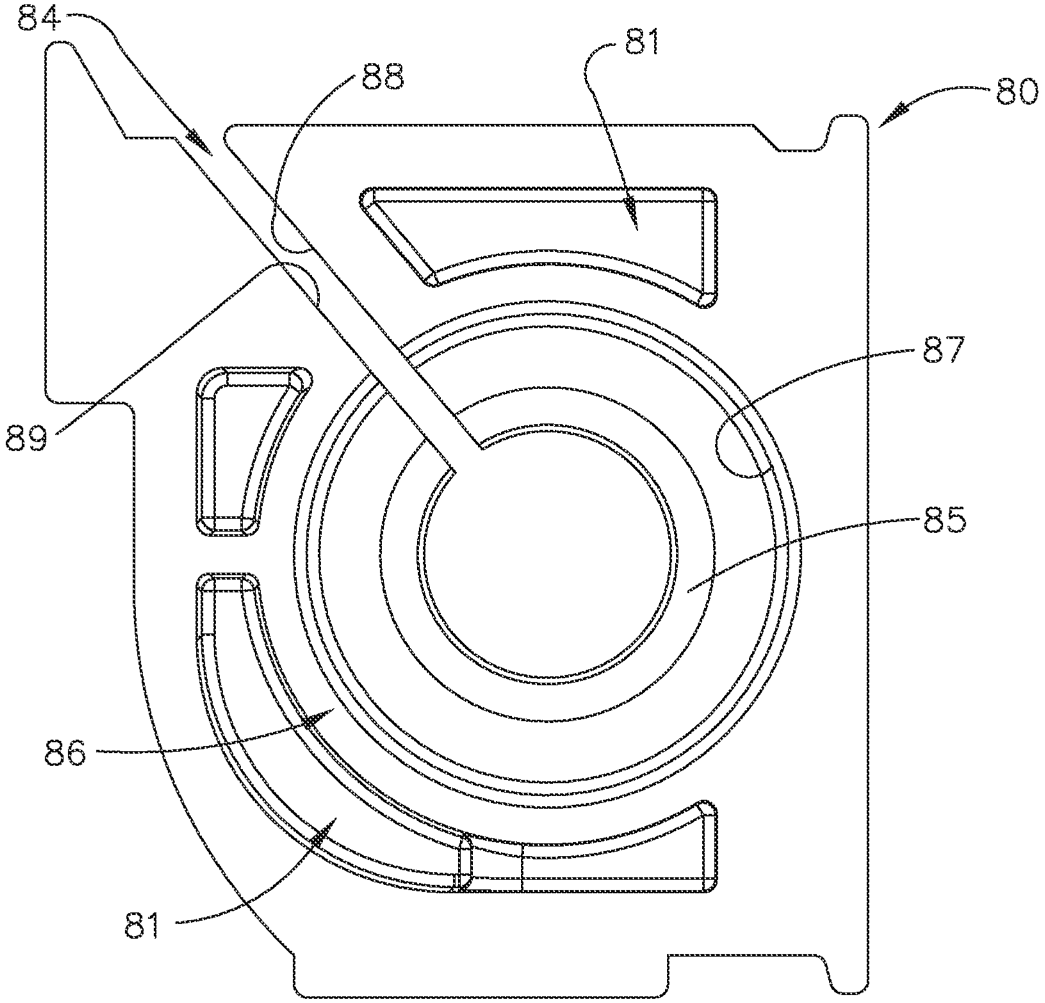
FIG. 12 a rear view of the clamp portion of the connector of FIG. 7.

Referring now to FIG. 12, the clamp 80 is shown in a rear view. A first wall 88 and a second wall 89 form a spaced-apart opening, which comprises the gap 84. When the lever 72 in the closed position 96, the first wall 88 and the second wall 89 partially close together, which decreases the opening of the gap 84, which in turn, increase the gripping force (or clamping force) at the clamping interface 23, which is at the surface 87. There is a plurality of openings 81 in the clamp material, which makes it easier to cast this part 80.

Figure 13:
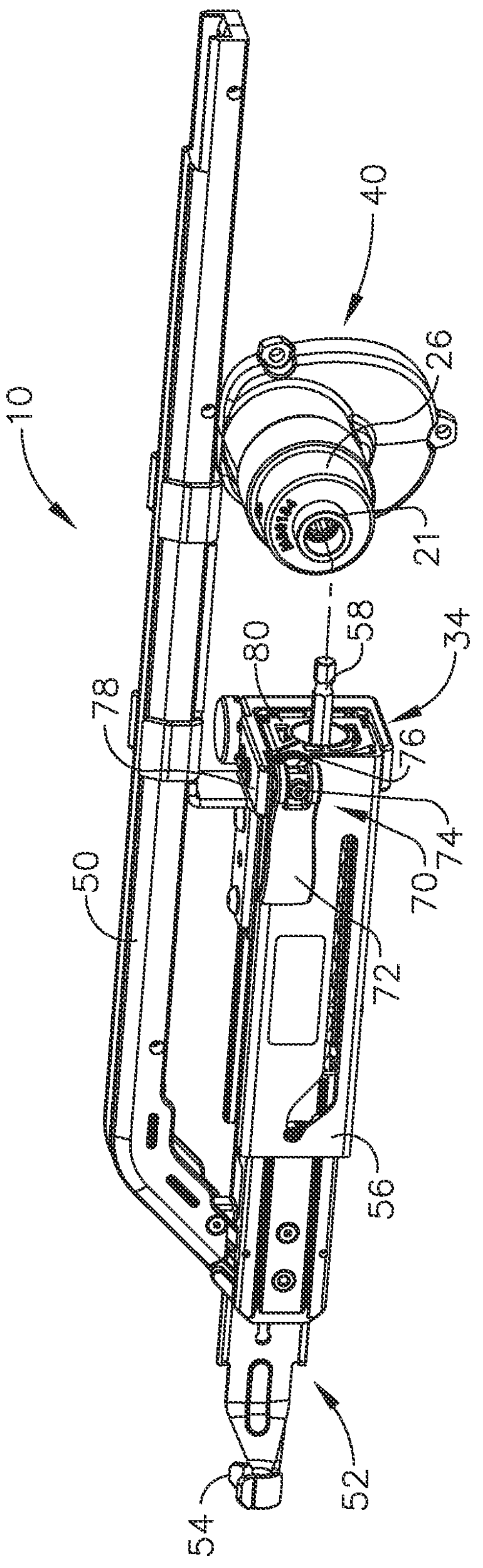
FIG. 13 is a perspective view of the attachment of FIG. 1, showing a portion of the interior of the front end of a manual-feed screwdriver that can be mated to the attachment.

Referring now to FIG. 13, the autofeed attachment 10 is shown separated from the tool 40. The tool 40 is rotated to illustrate the third extension end 26. The third extension end 26 exhibits a protrusion or post 21 (also sometimes referred to herein as a "protruding portion") which seats into the clamp 80 when mating the tool 40 to the autofeed attachment 10. At the same time, the tool's 40 chuck mates with the rotatable bit 58.

Operation

When a user decides to attach an autofeed attachment 10 to either an extension pole 20 or a tool 40, first the user must rotate the lever 72 along the attachment's longitudinal axis "L" into an open position. This ensures the connector portion 70 will accept the extension pole 20 or the tool 40, as the pole/tool is being installed.

Next, the user inserts either the first extension end 24 (of the extension pole 20) or the adapter end 26 (mated to the tool 40) into the connector portion 70. The post 25 (of the first extension end 24) will slot into the clamp 80. The rotatable bit 58 will mate with the extension shaft 30 and "soft-lock" into place via the bit retainer 32—see FIG. 4. Alternatively, the post 21 (of the adapter end 26) will slot into the clamp 80. The post 25 and the post 21 are sized and shaped to physically contact the inner surface 87. The rotatable bit 58 will mate with the chuck of the tool 40. At this point forward, however, the operation is the same.

It should be noted that the bolt 74 will preferably be tightened to a nominal position during assembly/construction at the factory; however, the user may wish to loosen or further tighten the bolt. This usually occurs after the lever 72 has been moved to the closed position 96, and the user tests the "tightness" of the hold on the extension pole 20 or the tool/adapter 40. The lever 72 is then moved back to an open position, and the bolt 74 is further loosened or tightened according to the user's preferences. If the bolt 74 is tightened too far, the lever 72 will not be able to fully rotate; conversely, if the bolt 74 is too loose, rotating the lever 72 will have an insufficient effect on the clamp 80.

Assuming the bolt 74 is tightened correctly, the user begins to pivot the lever 72 from the open position 94 to the closed position 96 (along the longitudinal axis L). As this rotation begins, the lever 72 has its thin portion 90 proximal to the washer 76. The bolt 74 has no additional force applied on it, and therefore, the gap 84 is fully open and the deformable portion 86 is not being deformed. Note that the lever 72 is guided along the longitudinal axis L by the flat extension 78, such that the lever is only able to rotate along that longitudinal axis.

As the lever 72 is pivoted, the thick portion 92 becomes moved to a position that is proximal to the washer 76. The thick portion 92 forces the bolt 74 to "pull," because the washer 74 does not deform, but more material is being forced into the same space (i.e., the thick portion of the lever). As the bolt 74 "pulls," the lever 72 begins to seat into the lever seat 79, and the gap 84 is forced to close to some extent.

As the gap 84 "closes," the clamp 80 is forced to deform, especially at its deformable portion 86. As the deformable portion 86 deforms, it causes the clamp 80 to more forcefully press inward toward its inner diameter. The clamp 80 thus "closes" onto the post 25 (or the post 21) and tightly "holds" that post.

Once the lever 72 is fully pivoted into the closed positon 96, the thick portion 92 is fully seated in the lever seat 79. At this point, the lever 72 is not easily pivoted back into the open position 94, due to the tightened physical contact between the lever seat 79 and the thick portion 92 of the lever 72. Of course, the amount of force required to 'break loose' the lever from its closed position 96 is adjustable by the user, merely by re-positioning the bolt 74, as per the user's wishes (as discussed above).

Alternative Embodiment

Figure 14:
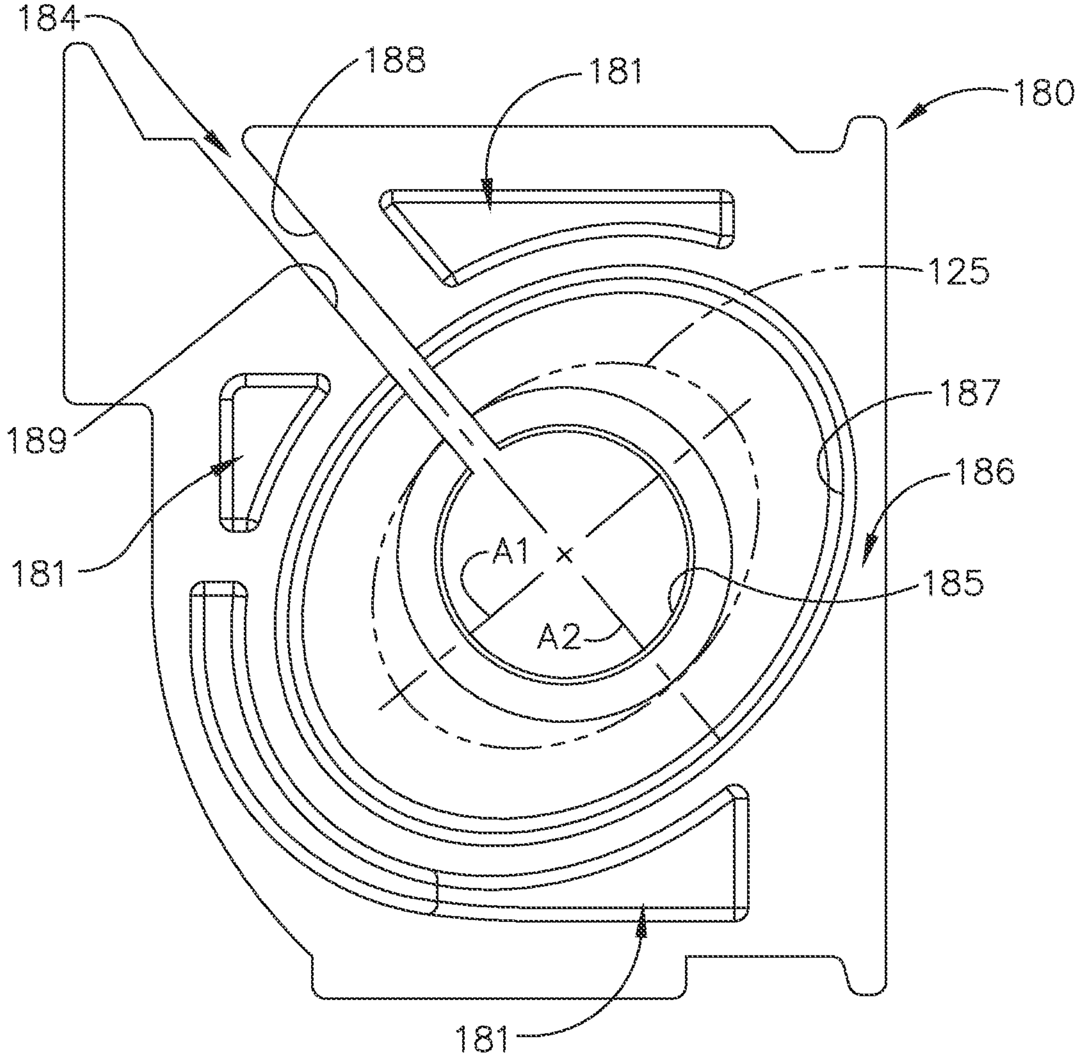
FIG. 14 a rear view of the clamp portion of an alternative embodiment connector, similar to that of FIG. 12.

Referring now to FIG. 14, an alternative design to a portion of the clamp is disclosed, in which the alternative clamp is generally designated by the reference numeral 180. As can be clearly seen in this view, the so-called clamping surface exhibits an elliptical shape, at reference numeral 187, whereas the clamping surface 87 in FIG. 12 of the first embodiment clamp exhibits a circular shape. In FIG. 14, the major axis of the ellipse is designated at "A1" whereas the minor axis of the ellipse is designated at "A2."

It will be understood that, for use with this alternative design clamp 180, the adapter or the first extension end of an extension pole would also be required to have a corresponding elliptical shape as the 'mating surface' to abut the clamping surface 187 of the clamp 180. At the same time, the thickness of the protrusion (such as the protrusion 25, viewed on FIG. 3) would probably be approximately maintained by having an inner surface that substantially corresponds to the elliptical shape of its outer surface (which abuts the clamping surface 187). The approximate elliptical shape at 125 on FIG. 14 shows an exemplary shape for that inner surface of the adapter/first extension end, if FIG. 14 was to include that extension end.

Other portions of the alternative design clamp 180 that would be affected, as compared to the first embodiment clamp 80, include the shapes of the deformable portion at 186, and the shapes of the openings 181 in the material, which make it easier to cast this part 180.

One advantage of providing a clamp 180 having a non-circular shape for its clamping surface at 187 is that such a shape certainly would tend to prevent any possible rotation between the attachment and the extension pole about the longitudinal axis of the attachment. Furthermore, by having a non-circular shape for the clamping surface at 187, there would be a more 'pointed' force at certain places along the perimeter of the clamping surface 187, which may more tightly grip the outer surface of the protrusion (at 125). This could be useful in applications in which the rotational forces are potentially greater than normally expected for most screwdriving tool and attachment combinations—perhaps for use with other types of tools that involve internal rotating shafts.

Certain portions of the alternative design clamp 180 could remain essentially identical to the first embodiment clamp 80. For example, the overall outer shape of the clamp 180 could remain the same, assuming the actual screwdriving forces remain essentially the same (for the same sizes and types of screws). The dimensions of the gap at 184, and its spaced-apart linear surfaces 188 and 189 could remain essentially the same as those at 84, 88, and 89 on FIG. 12—again, assuming other factors remain the same in their essential character. And further, the sizes and shapes of the pivotable lever 82, its associated bolt 74 and washer 76 could probably remain the same, for driving similar-sized and types of screws.

It will be understood that the precise sizes and shapes, and positions of the various components disclosed in the associated drawings can be altered without departing from the principles of the technology disclosed herein. The alternative clamp 180 is an example of such a change in size and/or shape of some of the important components.

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 8,869,656, and 8,627,749. These documents are incorporated by reference herein, in their entirety.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two male and female structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two male and female structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. An autofeed screwdriver attachment, comprising:

(a) a housing exhibiting an open first end used for attaching to a removable external tool, and an opposite, second end used for driving a fastener, said housing having a longitudinal axis that extends at least between said first end and said second end;

(b) a rotatable drive bit mounted along said longitudinal axis inside said housing;

(c) a connector portion proximal to said open first end, said connector portion comprising:

(i) a movable lever;

(ii) a washer proximal to said lever;

(iii) a clamp exhibiting a gap portion, a deformable portion, and an inner surface that is sized and shaped to make physical contact with a protruding portion of said external tool;

(iv) a bolt obliquely extending relative to the gap portion and securely mounting said movable lever, said washer, and said clamp to said housing;

wherein:

(d) if said movable lever is moved to a first position, said washer and said bolt do not cause said clamp to deform the deformable portion, and said gap portion is in an open state, such that said clamp inner surface does not securely hold the protruding portion of said removable external tool; and (e) if said movable lever is moved to a second position, said washer and said bolt exert a greater force on said clamp sufficient to deform the deformable portion, said gap portion becomes narrowed, and said clamp inner surface tightens around the protruding portion of said external tool so as to securely hold the external tool in place.

2. The attachment of claim 1, further comprising a rotatable shaft located at an interior portion of said external tool, wherein said rotatable drive bit mechanically couples to said rotatable shaft along the longitudinal axis when the external tool is securely held in place to said connector portion of the autofeed screwdriver attachment, and both said rotatable shaft and rotatable drive bit are free to rotate together while in this state.

3. The attachment of claim 1, wherein, said movable lever is mounted on said housing so that it pivots between said first and second positions, and that pivot action occurs along a path of movement that is substantially parallel to said longitudinal axis.

4. The attachment of claim 3, further comprising:

an extension mounted on said housing proximal to said washer of the connector portion, said extension exhibiting a flattened surface proximal to said washer;

wherein:

(a) said washer exhibits a flattened surface proximal to said extension's flattened surface; and (b) a close proximity of the flattened surfaces of the extension and washer prevents the washer and the movable lever from being significantly rotated in an axial direction to said longitudinal axis.

5. The attachment of claim 1, wherein, said removable external tool comprises at least one of:
(a) an extension pole;
(b) an electric screwdriver;
(c) an electric screwdriver with an adapter between a rotatable output shaft of the electric screwdriver and said connector portion of the autofeed screwdriver attachment; and
(d) an electric drill with an adapter between a chuck of the electric drill and said connector portion of the autofeed screwdriver attachment.

6. The attachment of claim 1, wherein said removable external tool comprises an extension pole that includes:
(a) an elongated cylindrical tube having a hollow interior area;
(b) a first end of the cylindrical tube that has a first open receiving area for connecting to said connector portion of the autofeed screwdriver attachment, wherein said first open receiving area includes the protruding portion of said removable external tool;
(c) a second, opposite end of the cylindrical tube that has a second open receiving area for connecting to at least one of an electric screwdriver, an electric drill, and an adapter that mates with one of said electric drill and said electric screwdriver at a distal end and that mates with said first open receiving area of the cylindrical tube at a proximal end; and
(d) a rotatable shaft that runs the length of said cylindrical tube, and which is sized and shaped to be in mechanical communication with said rotatable drive bit of the autofeed screwdriver attachment.

7. The attachment of claim 1, wherein:
said movable lever exhibits a thin portion and a thick portion as part of a cam profile of a shaft that is proximal to said washer;
said shaft of the movable lever pivots about a pivot pin that has an opening through which said bolt passes;
an outer portion of said movable lever has a path of movement that is substantially parallel to said longitudinal axis, as the lever is moved between its first and second positions; and
if the lever is positioned at said first position, the thin portion of the cam profile is proximal to said washer, and
if the lever is positioned at said second position, the thick portion of the cam profile is proximal to said washer and said thick portion makes physical contact with said washer.

8. The attachment of claim 1, wherein:
said clamp includes a retainer for holding said rotatable drive bit in position along the longitudinal axis; and
said retainer comprises at least one of a bearing and a bushing.

9. A method for attaching a power tool attachment to a power tool adapter, said method comprising:
(a) providing a power tool adapter that includes a first open end that includes a protrusion;
(b) providing a power tool attachment that includes:
(i) a housing including a second open end, said housing exhibiting a longitudinal axis that extends at least to said second open end;
(ii) a connector portion and that is proximal to said second open end of the power tool attachment, said connector portion being used for mating against said protrusion of said power tool adapter; and
(iii) a rotatable shaft positioned along the longitudinal axis of said housing;
(iv) said connector portion comprising:
(A) a movable lever;
(B) a washer proximal to said lever;
(C) a clamp positioned inside the housing and exhibiting a gap portion, a deformable portion, and an inner surface that is sized and shaped to make physical contact with said protrusion of the power tool adapter;
(D) a bolt that securely mounts said movable lever, said washer, and said clamp to said housing;
(c) inserting said protrusion of the power tool adapter into said inner surface of the clamp; and
(d) pivoting said movable lever, wherein:
(i) as said lever is pivoted, said gap portion moves to a more closed state; and
(ii) said deformable portion deforms such that said clamp inner surface tightens and grips said protrusion of said power tool adapter.

10. The method of claim 9, wherein, said power tool attachment comprises an autofeed screwdriver attachment, and said rotatable shaft comprises a drive bit of the autofeed screwdriver attachment.

11. The method of claim 9, wherein, said power tool adapter further comprises an opposite open end that attaches to at least one of:
(a) an electric screwdriver;
(b) an electric screwdriver with an adapter between a rotatable output shaft of the electric screwdriver and said connector portion of the autofeed screwdriver attachment; and
(c) an electric drill with an adapter between a chuck of the electric drill and said connector portion of the autofeed screwdriver attachment.

12. The method of claim 9, wherein, said power tool adapter comprises an extension pole having a rotatable drive shaft; and
further comprising the step of, mechanically coupling said rotatable drive shaft of the extension pole with said rotatable shaft of the power tool attachment, as said protrusion is inserted into said inner surface of the clamp.

13. The method of claim 9, wherein the step of pivoting said movable lever occurs along a path of movement that is substantially parallel to said longitudinal axis.

14. The method of claim 13, wherein:
(a) said connector portion of the power tool attachment further includes an extension mounted on said housing proximal to said washer, said extension exhibiting a flattened surface proximal to said washer;
(b) said washer exhibits a flattened surface proximal to said extension's flattened surface; and
(c) a close proximity of the flattened surfaces of the extension and washer prevents the washer and the movable lever from being significantly rotated in an axial direction to said longitudinal axis.

15. The method of claim 9, wherein:
(a) said movable lever exhibits a thin portion and a thick portion as part of a cam profile of a shaft that is proximal to said washer; and
(b) an outer portion of said movable lever has a path of movement that is substantially parallel to said longitudinal axis, as the lever is moved between its first and second positions; and
further comprising the steps of:

(c) pivoting said shaft of the movable lever about a pivot pin that has an opening through which said bolt passes;
(d) moving the lever to said first position, wherein the thin portion of the cam profile is proximal to said washer; or
(e) moving the lever to said second position, wherein the thick portion of the cam profile is proximal to said washer and said thick portion makes physical contact with said washer.

16. A clamp-on connector for an autofeed screwdriver attachment, said connector comprising:
(a) a movable lever;
(b) a washer;
(c) a clamp exhibiting a gap portion and a deformable portion;
(d) a bolt that securely mounts said movable lever, said washer, and said clamp to said autofeed screwdriver attachment;
(e) said autofeed screwdriver attachment including:
(i) a housing exhibiting an open first end used for attaching and an opposite, second end used for driving a fastener, said housing having a longitudinal axis that extends at least between said first end and said second end;
(ii) a rotatable drive bit mounted along said longitudinal axis inside said housing; and
(iii) said connector is positioned proximal to said open first end;
wherein:
(f) if said movable lever is moved to a first position, said gap portion is in an open position, and said deformable portion is not deformed and said clamp does not securely hold a removable external part; and
(g) if said movable lever is moved to a second position, said gap portion is in a more closed position, and said deformable portion is deformed and said clamp securely holds a removable external part
(h) an extension mounted on said housing proximal to said washer of the connector portion, said extension exhibiting a flattened surface proximal to said washer;
wherein:
(i) said washer exhibits a flattened surface proximal to said extension's flattened surface; and
(ii) a close proximity of the flattened surfaces of the extension and washer prevents the washer and the movable lever from being significantly rotated in an axial direction to said longitudinal axis.

17. The connector of claim 16, wherein, said movable lever is mounted on said housing so that it pivots between said first and second positions, and that pivot action occurs along a path of movement that is substantially parallel to said longitudinal axis.

18. The connector of claim 16, wherein:
said removable external part comprises at least one of:
an extension pole;
an electric screwdriver; and
an electric drill.

19. The attachment of claim 16, wherein:
said movable lever exhibits a thin portion and a thick portion as part of a cam profile of a shaft that is proximal to said washer;
said shaft of the movable lever pivots about a pivot pin that has an opening through which said bolt passes;
an outer portion of said movable lever has a path of movement that is substantially parallel to said longitudinal axis, as the lever is moved between its first and second positions; and
if the lever is positioned at said first position, the thin portion of the cam profile is proximal to said washer, and
if the lever is positioned at said second position, the thick portion of the cam profile is proximal to said washer and said thick portion makes physical contact with said washer.

* * * * *